United States Patent
Holbery et al.

(10) Patent No.: US 10,317,998 B2
(45) Date of Patent: Jun. 11, 2019

(54) FLEXIBLE MAGNETIC ACTUATOR

(71) Applicant: Microsoft Technology Licensing, LLC, Redmond, WA (US)

(72) Inventors: James David Holbery, Bellevue, WA (US); Christopher Patrick O'Dowd, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/633,359

(22) Filed: Jun. 26, 2017

(65) Prior Publication Data
US 2018/0373331 A1 Dec. 27, 2018

(51) Int. Cl.
| | |
|---|---|
| *B32B 5/02* | (2006.01) |
| *G06F 3/01* | (2006.01) |
| *G08B 6/00* | (2006.01) |
| *H02K 1/06* | (2006.01) |
| *H02K 7/14* | (2006.01) |
| *H02K 41/03* | (2006.01) |

(52) U.S. Cl.
CPC ............ *G06F 3/014* (2013.01); *B32B 5/02* (2013.01); *G06F 3/016* (2013.01); *G08B 6/00* (2013.01); *H02K 1/06* (2013.01); *H02K 7/14* (2013.01); *H02K 41/031* (2013.01); *G06F 3/011* (2013.01); *G06F 3/013* (2013.01); *H02K 2201/18* (2013.01)

(58) Field of Classification Search
CPC .......... G06F 3/014; G06F 3/016; G06F 3/011; G06F 3/013; G08B 6/00
See application file for complete search history.

(56) References Cited

U.S. PATENT DOCUMENTS

| | | |
|---|---|---|
| 8,579,842 B2 | 11/2013 | Majidi et al. |
| 9,317,141 B2 | 4/2016 | Smoot et al. |
| 9,607,491 B1 | 3/2017 | Mortimer et al. |
| 2003/0059609 A1 | 3/2003 | Rodgers |
| 2006/0209019 A1 | 9/2006 | Hu |
| 2011/0184440 A1 | 7/2011 | Saldinger |

(Continued)

FOREIGN PATENT DOCUMENTS

WO 2009110799 A1 9/2009

OTHER PUBLICATIONS

Bianchi, Matteo, "A Fabric-Based Approach for Wearable Haptics", In Journal of Electronics, vol. 5, Issue 3, Jul. 26, 2016, 14 pages.

(Continued)

*Primary Examiner* — James J Yang
*Assistant Examiner* — Kevin Lau
(74) *Attorney, Agent, or Firm* — Alleman Hall Creasman & Tuttle LLP

(57) ABSTRACT

An example magnetic actuator includes first and second flexible magnetic layers and a control circuit. The first flexible magnetic layer is configured to support a first magnetic dipole. Arranged in slidable contact with the first flexible magnetic layer, the second flexible magnetic layer is configured to support a second magnetic dipole. The control circuit is configured to controllably form at least the first magnetic dipole and thereby modify a force of interaction between the first and second flexible magnetic layers.

20 Claims, 15 Drawing Sheets

(56) References Cited

U.S. PATENT DOCUMENTS

| | | | | |
|---|---|---|---|---|
| 2015/0305432 | A1* | 10/2015 | Wiens | A43B 1/0054 |
| | | | | 36/97 |
| 2016/0342207 | A1* | 11/2016 | Beran | G06F 3/011 |
| 2016/0363997 | A1* | 12/2016 | Black | G06F 3/014 |
| 2017/0271922 | A1* | 9/2017 | Kim | H02J 50/12 |
| 2018/0102030 | A1* | 4/2018 | Khoshkava | G08B 6/00 |

OTHER PUBLICATIONS

"International Search Report And Written Opinion Issued In PCT Application No. PCT/US18/034258", dated Aug. 22, 2018, 11 Pages.

* cited by examiner

FLEXIBLE MAGNETIC ACTUATOR

BACKGROUND

A state-of-the-art virtual reality (VR) or mixed reality (MR) holographic system may immerse a user in a convincing alternative reality, where visual and auditory aspects of virtual objects are represented in a true-to-life manner.

SUMMARY

Examples are disclosed that relate to a magnetic actuator comprising first and second flexible magnetic layers and a control circuit. The first flexible magnetic layer is configured to support a first magnetic dipole. Arranged in slidable contact with the first flexible magnetic layer, the second flexible magnetic layer is configured to support a second magnetic dipole. The control circuit is configured to controllably form at least the first magnetic dipole and thereby modify a force of interaction between the first and second flexible magnetic layers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
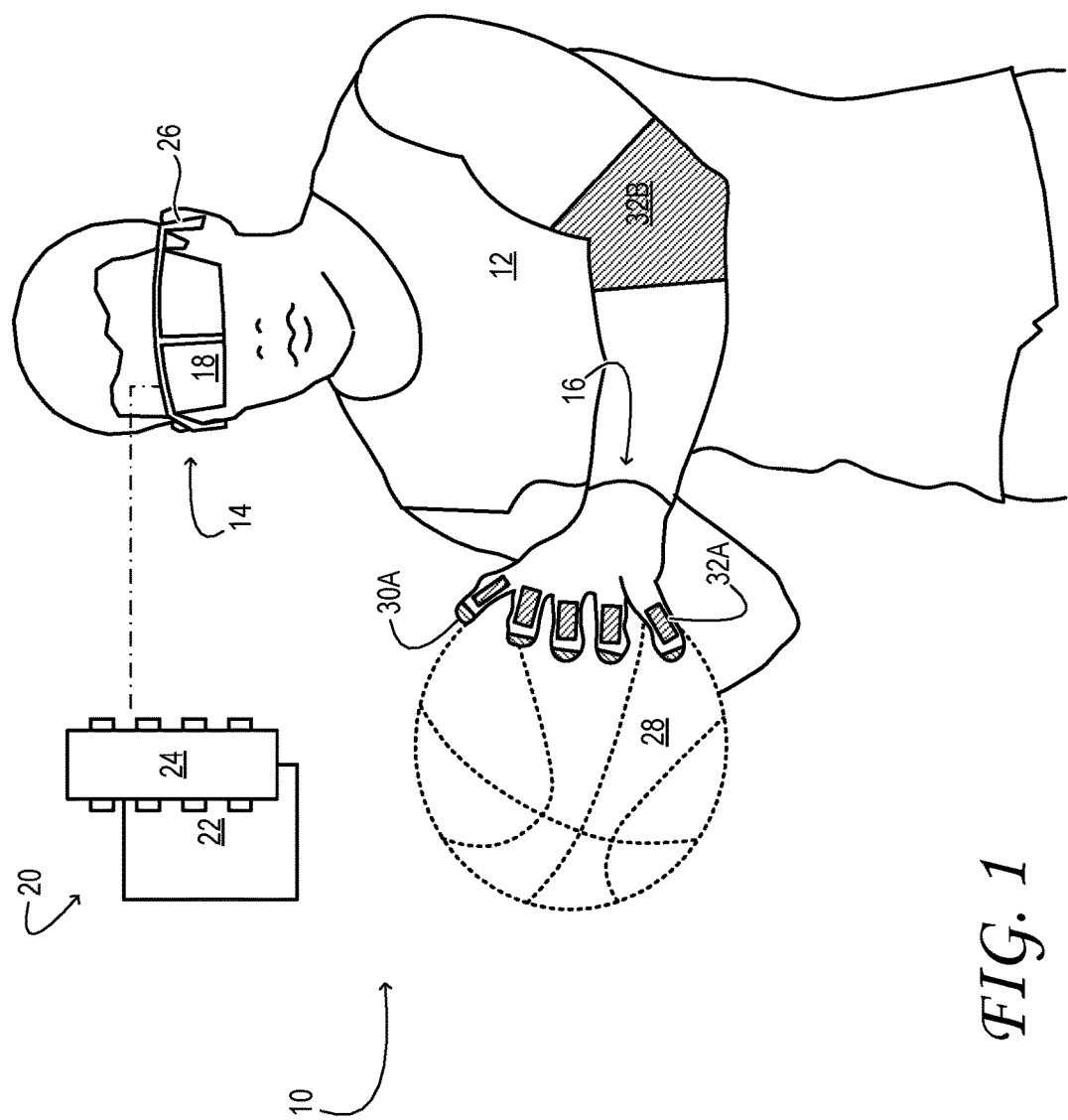
FIG. 1 shows aspects of an example display system including a body-movement restriction device.

This disclosure is presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Examples are disclosed that relate to magnetically actuated movement restriction devices to selectively restrict movement. The disclosed examples may be used in mixed-reality and virtual-reality display systems and environments, and may also be used to control or restrict movement in numerous other application areas.

FIG. 1 shows aspects of an example mixed-reality system 10 configured to present a lifelike mixed reality to user 12. The illustrated system may be used for game play and for numerous other activities. Mixed-reality system 10 includes a headset 14 and a haptic device 16. The headset includes a stereoscopic, near-eye display 18 configured to display virtual imagery in the field of view of the user. In some examples, the near-eye display is a see-through display, enabling real-world and virtual imagery to be admixed in the user's field of view. In other examples, the near-eye display is opaque, providing a fully immersive virtual reality. In headset 14, an electronic signal encoding the virtual display imagery is sent to the near-eye display via on-board computer 20. The on-board computer includes at least one processor 22 and associated electronic memory device 24.

Leveraging communications componentry arranged in headset 14, on-board computer 20 may be coupled communicatively to one or more off-board computers on a network. Thus, the virtual display imagery that user 12 sees may, in some examples, be composed and/or rendered by an off-board computer. In other examples, the virtual display imagery may be composed and rendered on-board. Headset 14 includes stereophonic loudspeakers 26 that enable user 12 to experience immersive audio.

While state-of-the-art mixed-reality and virtual-reality display systems may provide an immersive visual and auditory experience for the user, they may fail to provide a satisfying tactile experience, in which virtual objects feel like the real objects they represent. Accordingly, haptic device 16 of mixed-reality system 10 is configured to further augment the user experience by providing lifelike contact sensation responsive to user interaction with the virtual environment. In particular, the haptic device may be configured to provide a mechanical, resistive contact sensation in response to detection of 'contact' between the body of the user and a virtual display object projected into a field of view of the user. For instance, the mechanical, resistive contact sensation may be provided whenever the hand of user 12 intersects virtual display object 28.

Haptic device 16 may optionally include a skin-pressure simulation portion 30A. The skin-pressure simulation portion is configured to apply touch-simulating pressure to the user's skin in the vicinity of contact with a virtual display object. The skin-pressure simulation portion may include an actuator configured to apply pressure in a direction normal to the surface of the skin. The skin-pressure simulation portion may include a piezoelectric or voice-coil type actuator, for example. To determine when to apply the pressure, the skin-pressure simulation portion is communicatively coupled to one or more computers of mixed-reality system 10, such as on-board computer 20 of headset 14. The computer may be configured to host a model of the virtual environment and also to track the position of the user's hand with the real-world coordinates of that model. When contact between the hand and a solid virtual object is indicated, the actuator is energized and pressure is applied to the skin. The actuator is de-energized when contact is no longer indicated. Accordingly, the skin-pressure simulation portion may be configured to give static, rather than dynamic, actuation pursuant to contact with a virtual object.

Although skin-pressure simulation portion 30A may simulate the sensation of the touch of a virtual object on the user's skin, this aspect alone may not provide a satisfactory contact sensation, as it fails to reproduce the resistive effect of object contact on the user's skeletal joints. Contact with an actual solid object, by comparison, would result in the sensation of kinematic resistance to attempted movement through the object, which would be felt at the joints. Finger joints, for example, when attempting to move the fingers through a solid object, would experience reactive force from the object—'reactive' being understood in the context of Newton's third law.

To simulate the reactive force, haptic device 16 includes at least one body-movement restriction portion 32 comprising a magnetic actuator. In the example shown in FIG. 1, a first body-movement restriction portion 32A is arranged in a glove worn on the hand of user 12, and a second body-movement restriction portion 32B is arranged in a sleeve worn around the arm. A sleeve supporting a body-movement restriction portion may be worn alternatively or additionally on the leg or other body part. Body-movement restriction portion 32 may be used either with or without skin-pressure simulation portion 30 in various implementations.

Figure 2:
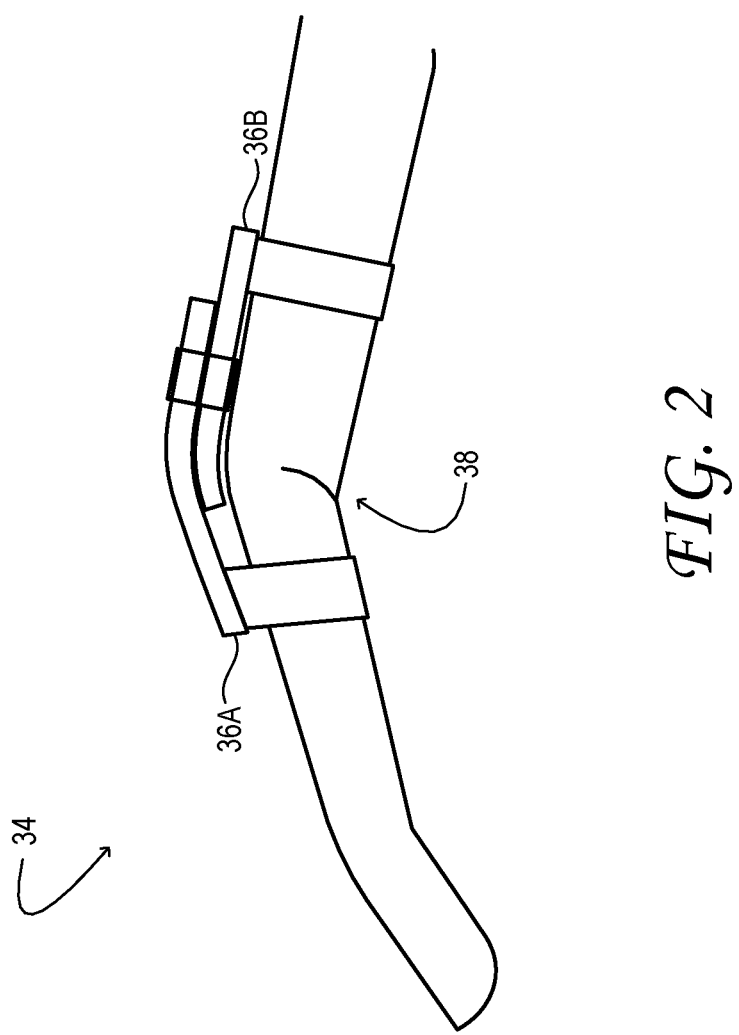
FIGS. 2 and 3 show aspects of an example magnetic actuator of a body-movement restriction device.

FIG. 2 shows aspects of magnetic actuator 34 of body-movement restriction portion 32A. The magnetic actuator is configured to vary a force of interaction between two magnetic layers 36 movable translationally with respect to each other. In the example of FIG. 2, first magnetic layer 36A is coupled to the skin on a first side of a skeletomuscular joint 38, and second magnetic layer 36B is coupled in sliding relation with first magnetic layer 36A. Each of the first and second magnetic layers may be secured to the skin of the user, or otherwise closely coupled to an articulable region of the body. Configurations differing from that of FIG. 2 are also envisaged. For example, the body-movement restriction portion may take the form of a tube around the finger that becomes stiffer to restrict movement. In yet another example, opposing magnetic layers may be arranged as overlapping scales on a medieval-style armor glove.

Figure 3:
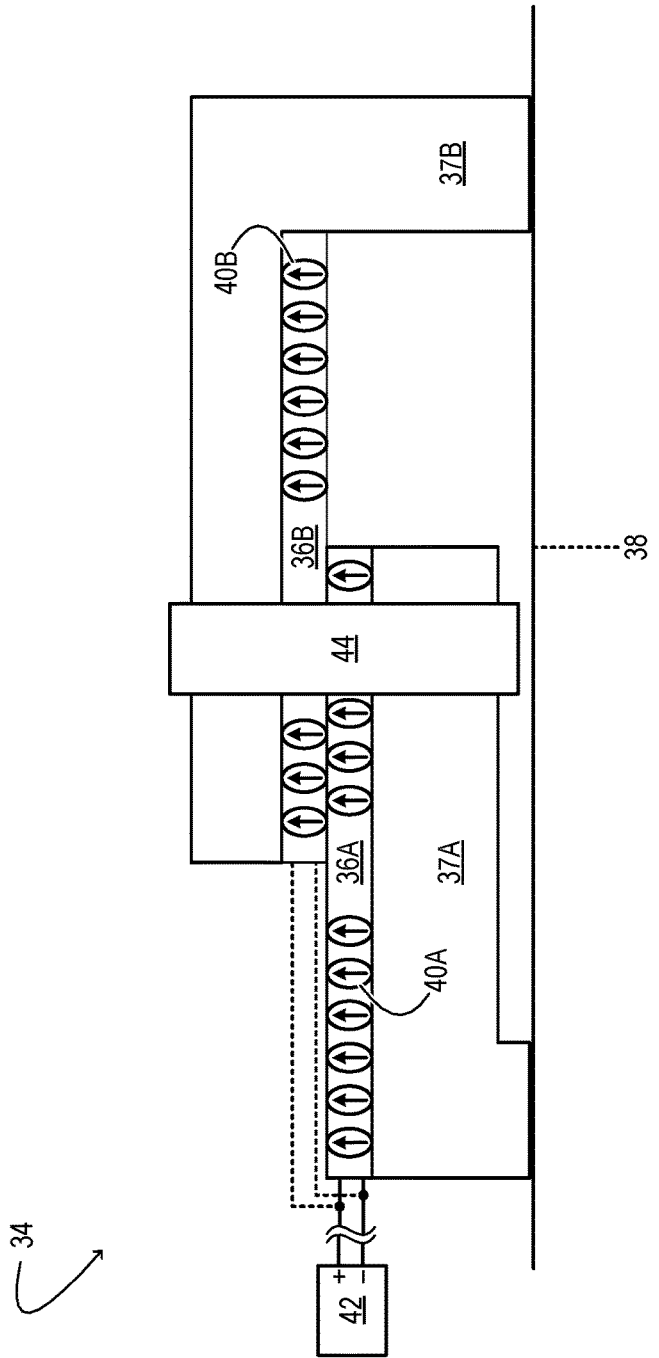

FIG. 3 shows more detail of magnetic actuator 34 in one example, where first magnetic layer 36A is arranged in slidable contact with second magnetic layer 36B. Each of the first and second magnetic layers is configured to support a plurality of magnetic dipoles 40—viz., magnetic dipoles 40A of the first magnetic layer and magnetic dipoles 40B of the second magnetic layer. In the drawings, the direction of each magnetic dipole is indicated by a north-to-south pointing arrow. The magnetic actuator also includes a control circuit 42 configured to controllably form or reorient the magnetic dipoles of at least the first magnetic layer, and thereby modify a force of interaction between the first and second magnetic layers. In the illustrated example, first magnetic layer 36A and second magnetic layer 36B are held in close contact via guide 44, which permits the layers to slide relative to one another. In other examples, any other suitable structure for holding the layers in sufficiently close contact may be used. Likewise, although the magnetic layers of FIG. 3 are shown coupled to support structures 37A and 37B, in other examples the magnetic layers may be self-supporting.

As noted above, a force of interaction between first magnetic layer 36A and second magnetic layer 36B may exist under appropriate conditions. The magnitude and direction of the force of interaction may depend on the orientation of the magnetic dipoles of the first and second magnetic layers, such that reorienting the magnetic dipoles has the effect of modifying the force—e.g., reducing or increasing the magnitude and/or changing the direction of the force.

Figure 4:
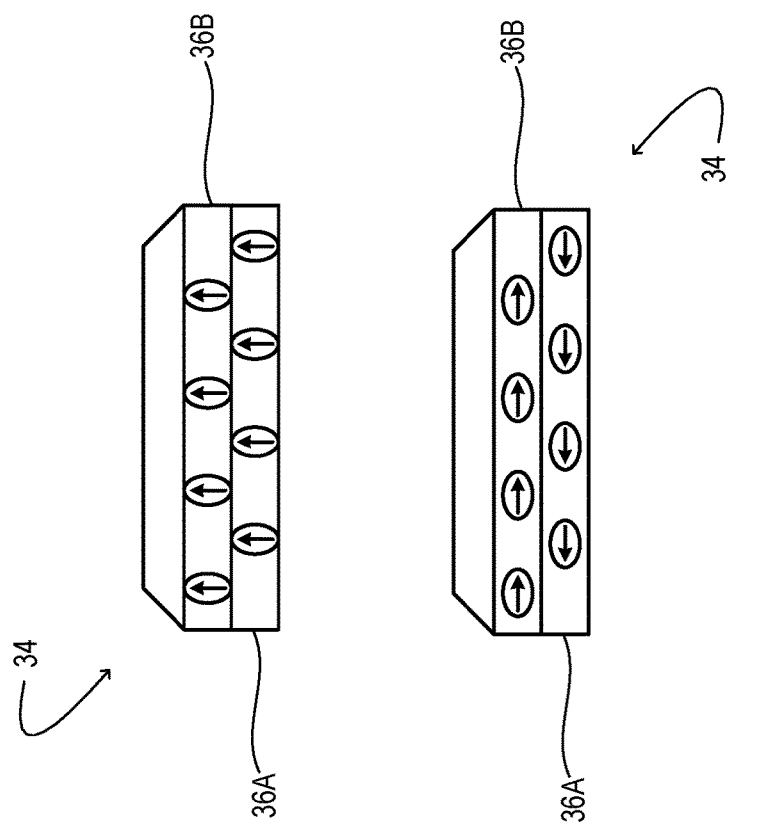
FIGS. 4 and 5 shows aspects of opposing first and second magnetic layers of an example magnetic actuator.
Figure 5:
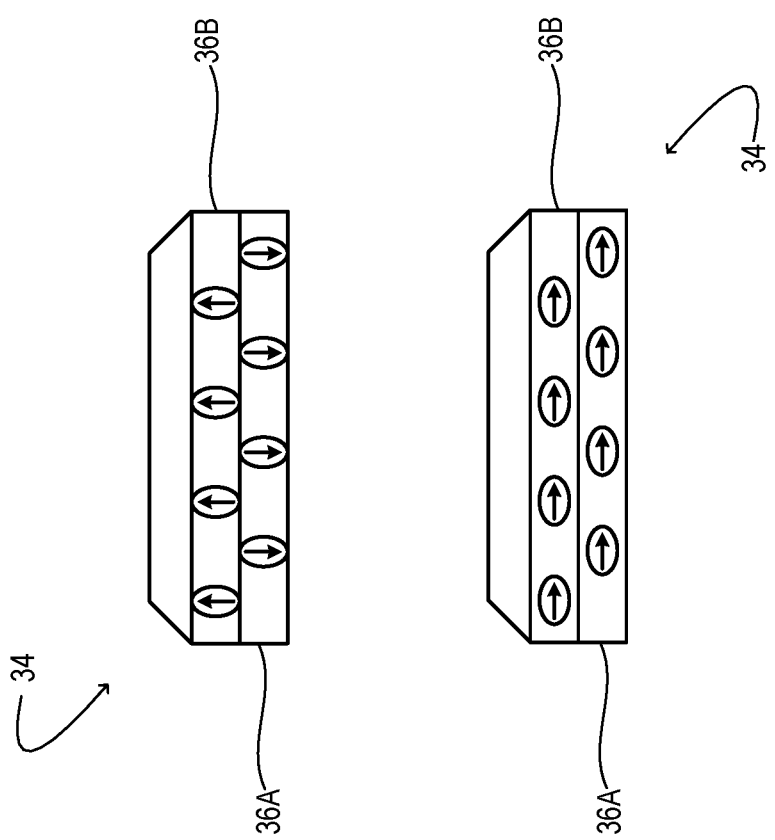

One force of interaction that may exist between the first and second magnetic layers is a friction force—sliding friction in configurations in which the first or second magnetic layer is configured to slide against the other magnetic layer, and torsional friction in configurations in which the first or second magnetic layer is configured to rotate against the other magnetic layer. The friction force is proportional to the normal force that biases the first and second magnetic layers against each other. The normal force may be influenced by the orientation of the magnetic dipoles of the first and second magnetic layers. In both pairs of opposing magnetic layers 36 shown in FIG. 4, the magnetic dipoles are arranged so as to increase the normal force (relative to a state in which the magnetic dipoles are absent), which in turn increases the frictional force. The same part numbers are used in both pairs of opposing magnetic layers in each of FIGS. 4 and 5 to indicate that the layers are the same although the depicted dipole directions are different. In both pairs of opposing magnetic layers 36 shown in FIG. 5, the magnetic dipoles are arranged so as to decrease the normal force, which in turn decreases the friction force.

In configurations in which the normal force is decreased to the extent that the first and second magnetic layers no longer contact each other, the friction force between the two magnetic layers largely vanishes, but a repulsive force of interaction between the two magnetic layers may exist. In some configurations, a repulsive force of interaction may bias the first and/or second magnetic layer against an adjacent static structure, subjecting that layer to another friction force.

Figure 6:
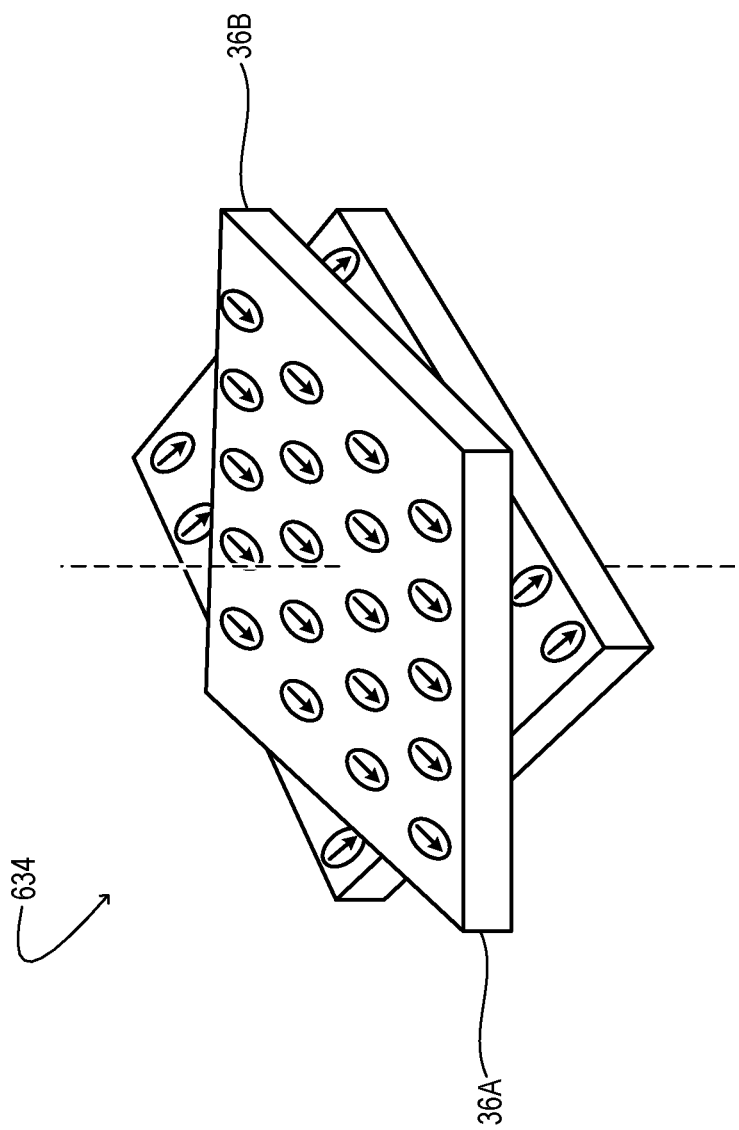
FIG. 6 shows aspects of opposing first and second magnetic layers of another example magnetic actuator.

In some configurations, the relative orientation of magnetic dipoles 40 of the first and second magnetic layers may provide a torsional force of interaction between the layers. The torsional force of interaction may be such as to cause the first and second magnetic layers to counter rotate. This example is shown for magnetic actuator 634 of FIG. 6.

As noted above, magnetic actuator 34 includes at least one pair of opposing magnetic layers 36. In the following description, aspects of each of the individual magnetic layers will first be described; then, the various modes of combining the layers into a functioning magnetic actuator will be addressed.

Figure 7:
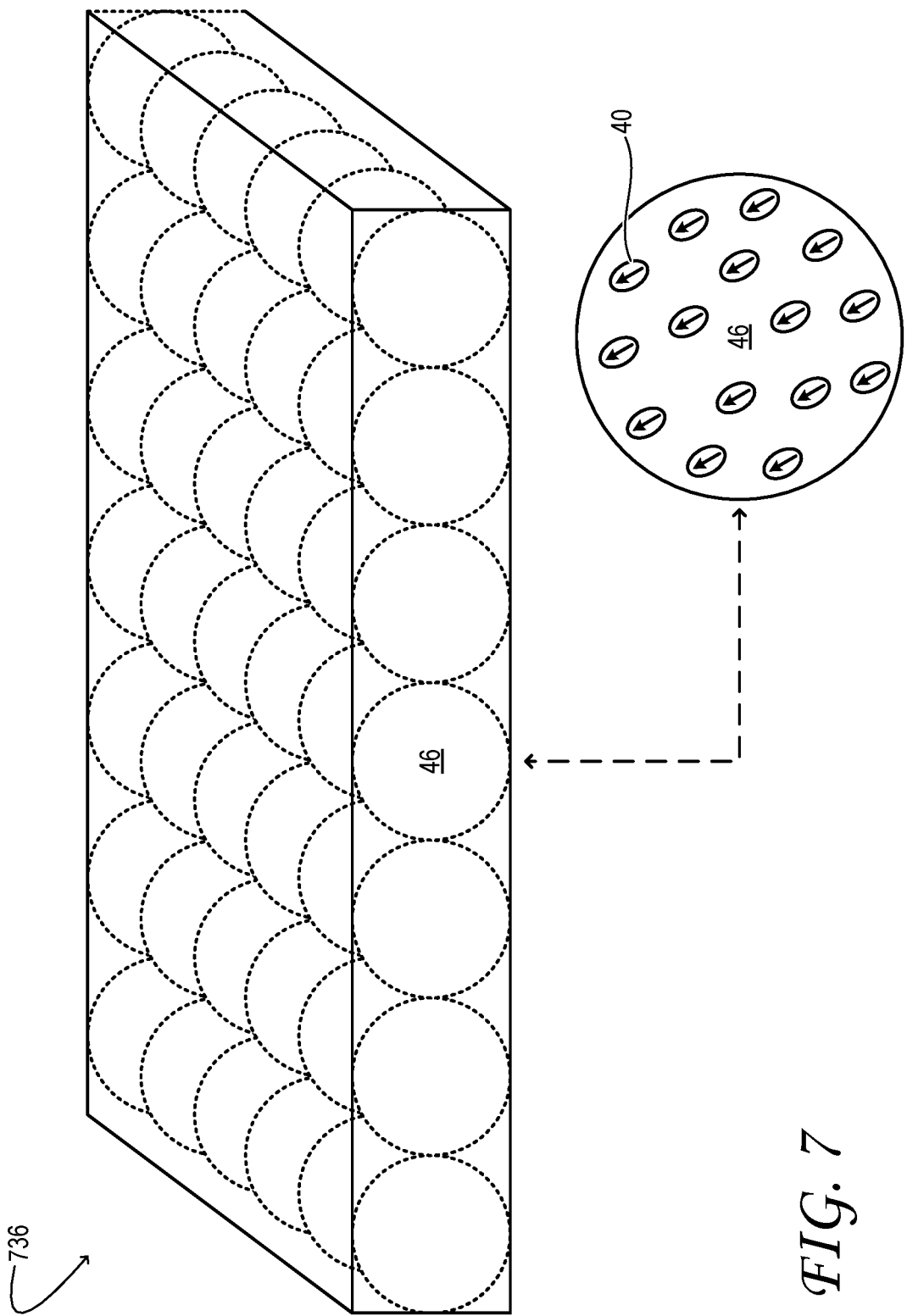
FIG. 7 shows aspects of an example magnetic layer of a magnetic actuator.

In the context of this disclosure, a magnetic layer 36 may be an electromagnetic layer, a permanent magnetic layer, or an electropermanent magnetic layer. FIG. 7 schematically shows a permanent or electropermanent magnetic layer 736 having a plurality of discrete magnetic domains, schematically shown at 46. In some embodiments, magnetic dipoles 40 of the permanent or electropermanent magnetic layer are contained within the magnetic domains and mutually aligned therein. The magnetic dipoles of the various domains may be oriented in any direction, and may be reoriented in the presence of an external magnetic field. The intrinsic coercivity of a material is the parameter that determines the magnitude of the external magnetic field required to reorient the magnetic dipoles of that material. In general, the magnetic dipoles of different domains may be oriented in parallel, or oriented differently, depending on conditions.

Figure 8:
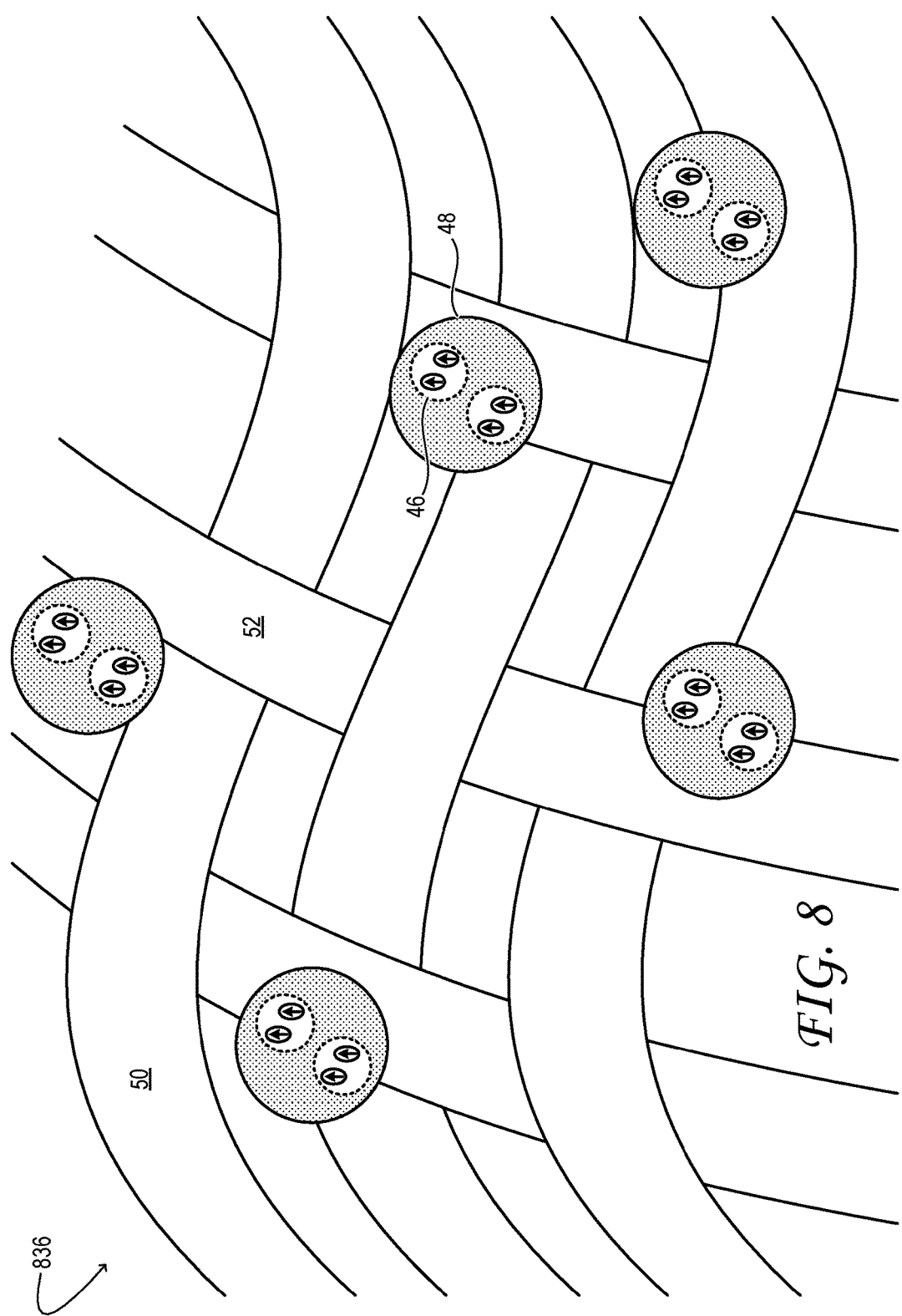
FIGS. 8 and 9 show aspects of example magnetic fabric layers of a magnetic actuator.
Figure 9:
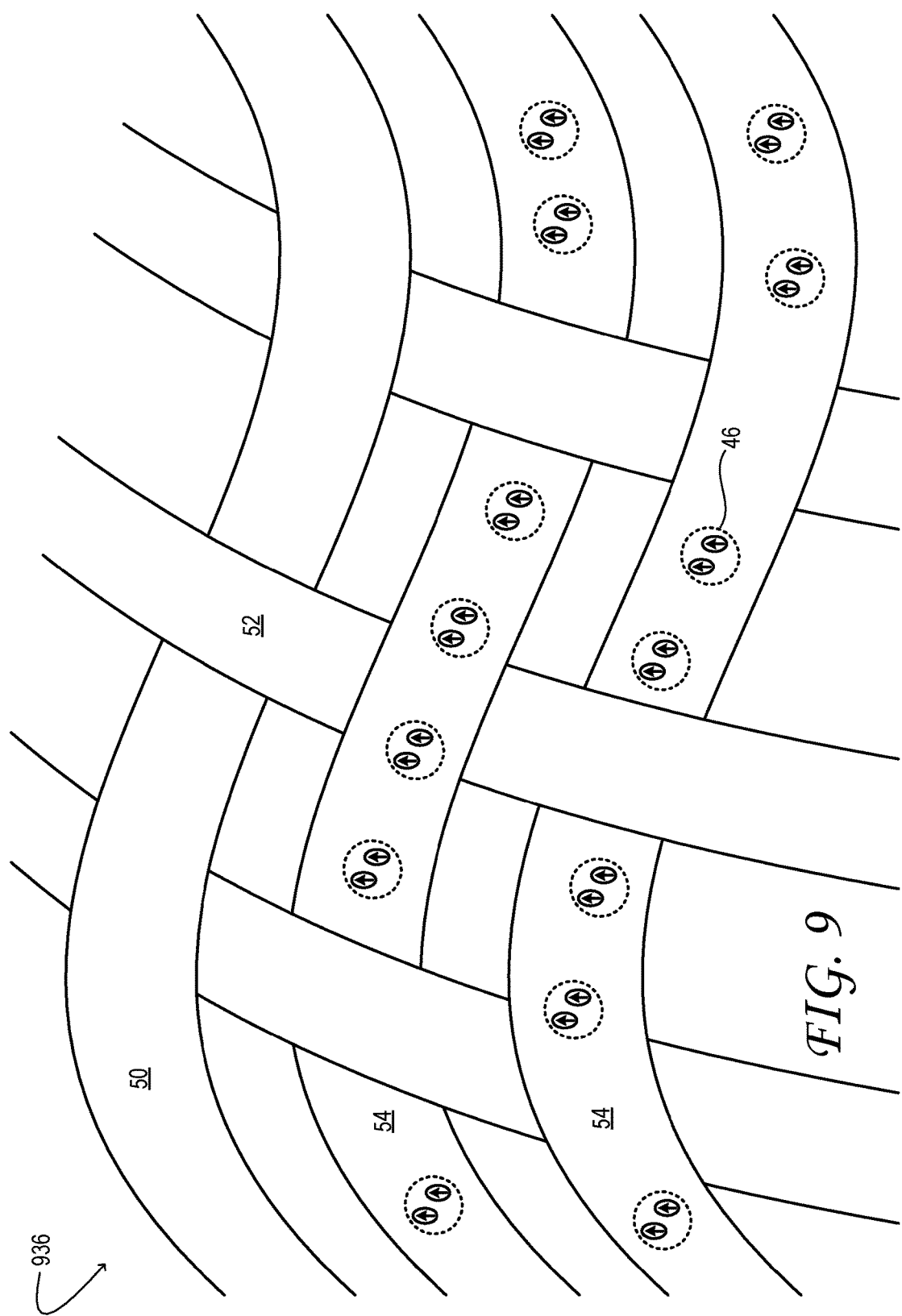

In some embodiments, one or both of first magnetic layer 36A and second magnetic layer 36B of magnetic actuator 34 may be a magnetic fabric layer. Electromagnetic, permanent, and electropermanent magnetic fabric layers are envisaged herein. In permanent and electropermanent magnetic fabric layers, various magnetic domains and included magnetic dipoles are arranged within a flexible substrate e.g., a fabric or textile. In some examples, such a fabric may be comprised of woven threads or fibers. In other examples, the fabric may be non-woven, like paper or felt. In yet other examples, non-textile materials, such as polymer sheets (including elastomer sheets) may be used. As shown schematically in FIG. 8, magnetic domains 46 of a magnetic fabric layer 836 may, in some examples, be arranged within particles 48 distributed within the magnetic fabric layer, external to non-magnetic warp fibers 50 and non-magnetic weft fibers 52. In other examples, the magnetic domains may be included within magnetic warp fibers 54, as shown for magnetic fabric layer 936 of FIG. 9. Alternatively or in addition, magnetic domains may be included within magnetic weft fibers. It will be understood that a magnetic fabric layer may include a large number of non-magnetic warp and weft fibers (e.g., thread or yarn fibers) with a smaller number of magnetic fibers distributed therein, in some examples.

Figure 10:
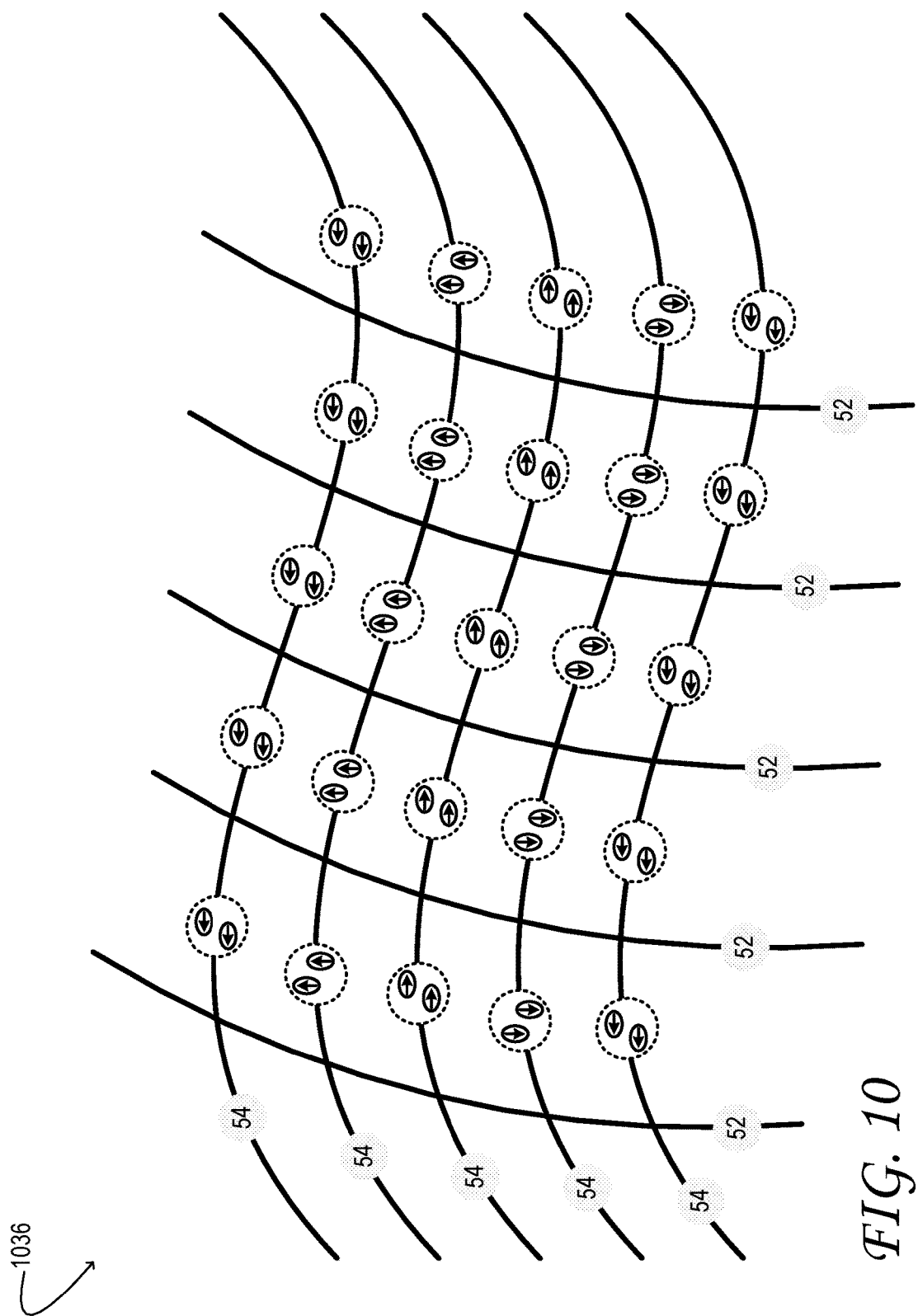
FIG. 10 shows aspects of an example magnetic warp fiber of a magnetic fabric layer.

A magnetic fabric layer (as first magnetic layer 36A or second magnetic layer 36B of magnetic actuator 34) may be configured in the form of a permanent magnetic fabric layer with permanent magnetic dipoles. In this type of magnetic layer, the magnetic dipoles of the various magnetic domains are not intended to change orientation during use of the magnetic actuator. In the example of magnetic fabric layer 1036 of FIG. 10, a series of magnetic warp fibers 54 with differently oriented permanent magnetic dipoles is arranged in the form of a Halbach array. In a Halbach array, greater magnetic flux density is biased toward one side of a series of magnetic elements (warp fibers 54 in this case). In the configuration illustrated in FIG. 10, the greater magnetic flux density is above the plane of the drawing sheet, while the area below the drawing sheet supports relatively little magnetic flux density. In magnetic actuator 34, the side supporting the greater flux density may be directed toward an opposing magnetic layer, an arrangement that may maximize the force of interaction between the first and second magnetic layers. In this and other embodiments, the individual magnetic fibers comprising a permanent or electropermanent magnetic fabric layer can be magnetized prior to incorporation into the fabric magnetic layer, or after incorporation into the fabric magnetic layer, as determined by ease of manufacturing.

Figure 11:
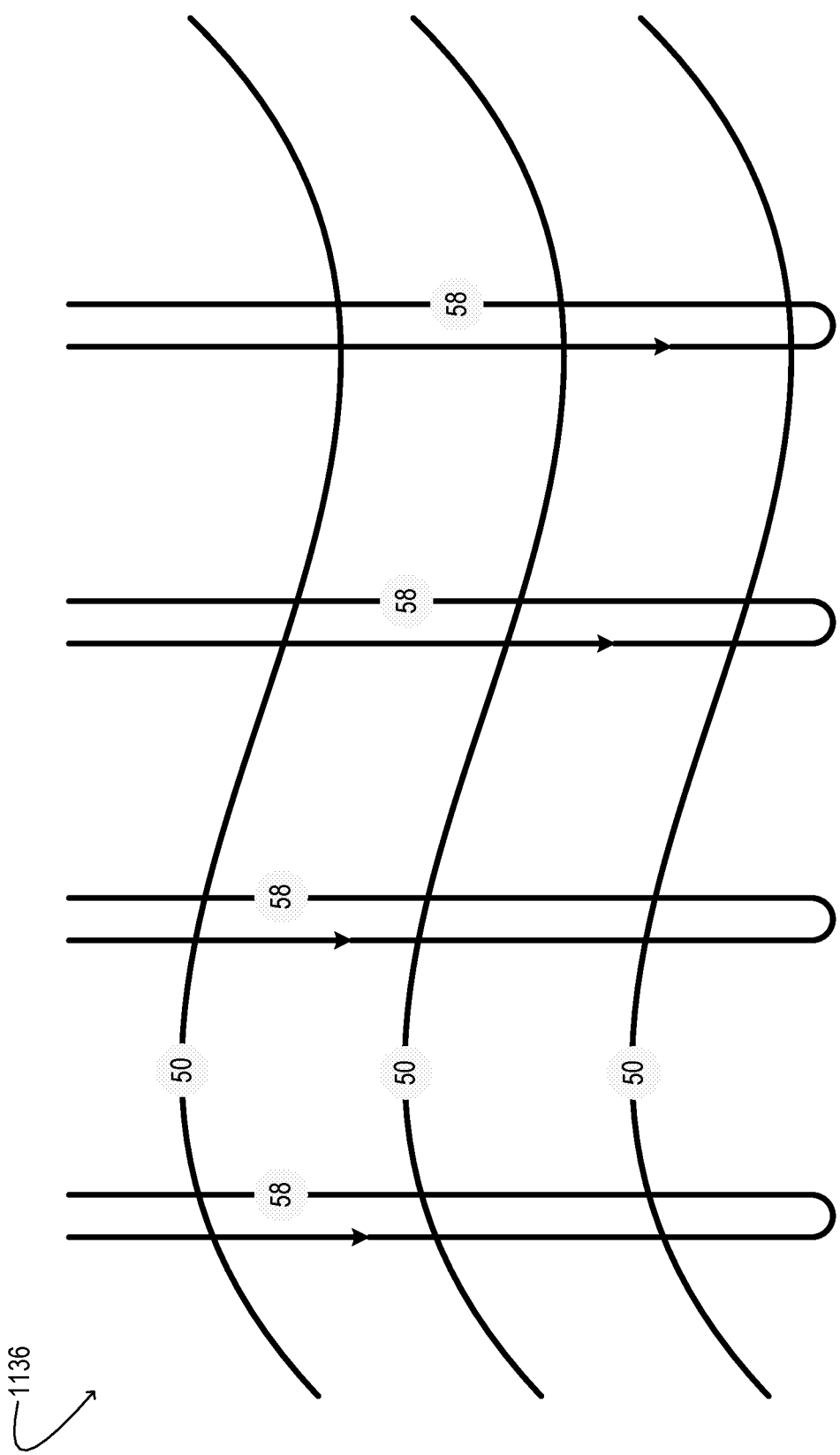
FIGS. 11 and 12 show aspects of other example electromagnetic fabric layers of a magnetic actuator.
Figure 12:
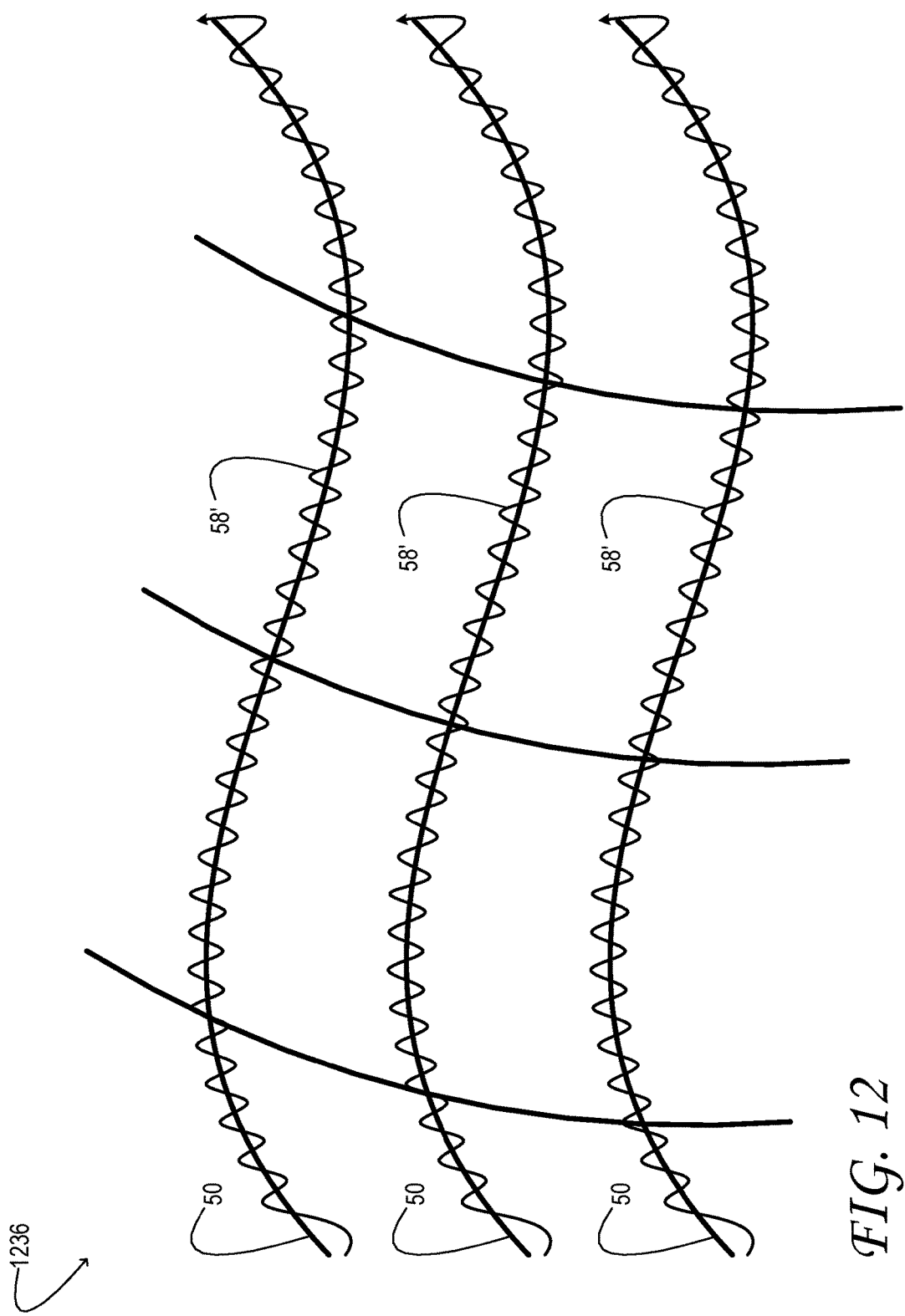

To enable selective control of the frictional force between magnetic layers, a magnetic layer (as first magnetic layer 36A and/or second magnetic layer 36B of magnetic actuator 34) may be configured in the form of an electromagnetic fabric layer, as shown in FIGS. 11 and 12. In this type of layer, winding 58 carries an electric current and supports an induced magnetic dipole and magnetic field both inside and outside of the winding. The winding may be a solid or stranded copper (or other suitable metal) wire, for example. In general, an induced magnetic field is resolvable into one or more induced magnetic dipoles, which vanish when the electric current is removed. FIG. 11 shows an electromagnetic fabric layer 1136 having a loop winding 58 that encircles the electromagnetic fabric layer, running in the weft direction of the weave. FIG. 12 shows an electromagnetic fabric layer 1236 having an embroidered winding 58' extending helically across the electromagnetic fabric layer, arranged in the warp direction of the weave.

Windings 58 of FIGS. 11 and 12 may be operatively coupled to a control circuit 42 (referring briefly back to FIG. 4), which controls the magnitude and direction of electric current flowing through the winding. As noted above, the electric current induces a magnetic dipole and a magnetic field within and around the winding. In some variants of magnetic actuator 34, the induced magnetic dipole may be used directly to control the force of interaction with the opposing magnetic layer, which may be another electromagnetic fabric layer, a permanent (e.g., Halbach) magnetic fabric layer, or an electropermanent magnetic fabric layer (vide infra).

Figure 13:
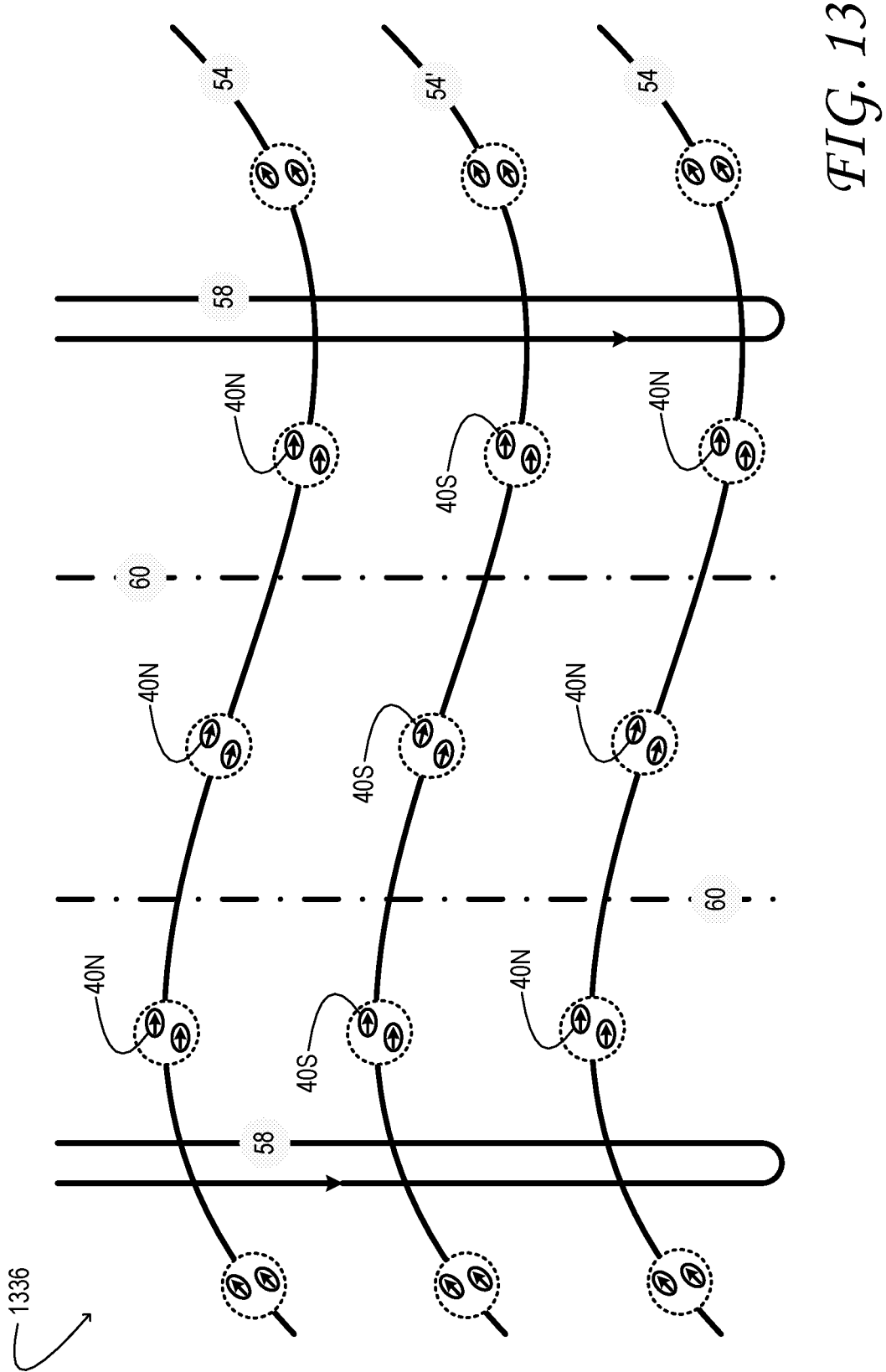
FIGS. 13, 14, and 15 show aspects of example electropermanent magnetic fabric layers of a magnetic actuator.

A magnetic fabric layer (as first magnetic layer 36A and/or second magnetic layer 36B of magnetic actuator 34) may also be configured in the form of an electropermanent magnetic array, as shown in FIG. 13. In the warp direction of electropermanent magnetic fabric layer 1336 runs a warp magnetic fiber 54 of relatively higher intrinsic coercivity and a warp magnetic fiber 54' of relatively lower intrinsic coercivity. In the weft direction, transverse to both of the warp fibers, runs a ferromagnetic shunt fiber 60 and a winding 58. In some embodiments, the higher-coercivity magnetic fiber includes neodymium-iron-boron (NdFeB, 1120 kA/m), the lower-coercivity fiber includes aluminum-nickel-cobalt (AlNiCo, 50 kA/m), and the ferromagnetic shunt fiber includes soft iron. The winding may be the same as described above and illustrated in FIG. 11, for example. The electropermanent fabric layer includes a plurality of switchable magnetic dipoles 40S arranged in the magnetic domains of warp magnetic fiber 54' and a plurality of non-switchable magnetic dipoles 40N arranged in the magnetic domains of warp magnetic fiber 54. The switchable and non-switchable magnetic dipoles may induce sympathetic magnetic dipoles in magnetic shunt fibers 60 under appropriate conditions (vide infra).

In the OFF state shown in FIG. 13, magnetic dipoles 40S and 40N are aligned in parallel, such that there is no sympathetic magnetic dipole in the magnetic shunt fibers. Winding 58 of electropermanent magnetic fabric layer 1336 is configured to form an induced magnetic field in the electropermanent magnetic fabric layer on passage of electric current through the winding. To this end, the winding is operatively coupled to a control circuit that controls the magnitude and direction of electric current flowing through the winding. The induced magnetic field may reorient switchable magnetic dipoles 40S of the lower-coercivity magnetic fibers, thereby switching their polarity. The magnetic dipoles of the higher-coercivity magnetic fibers are comparatively unaffected by the induced magnetic field. Once the switchable magnetic dipoles are reoriented, they remain in that orientation until a different (e.g., opposite) magnetic dipole is induced via the winding. In this manner, the force of interaction between the first and second magnetic layers can be modified.

Figure 14:
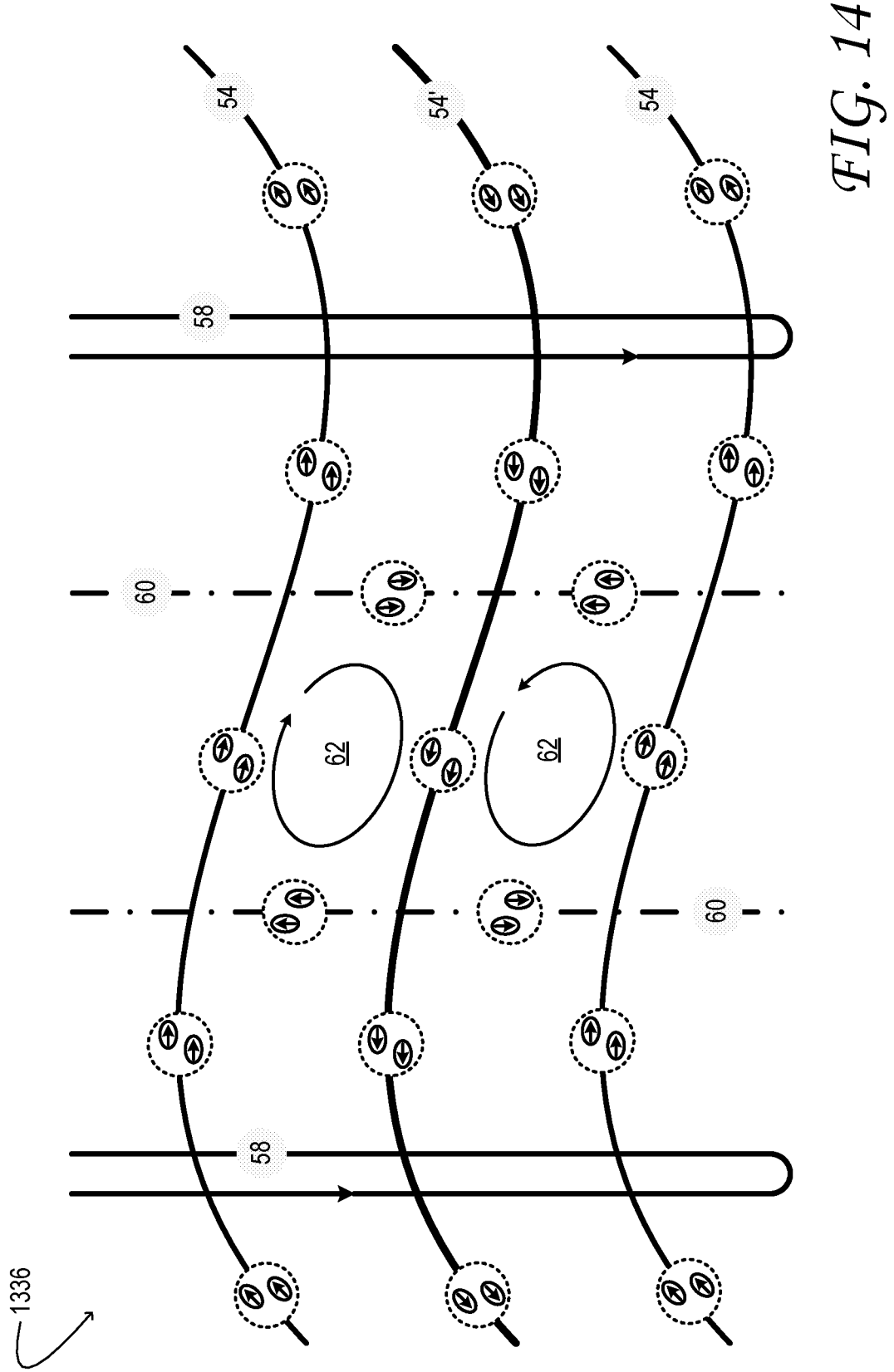
Figure 15:
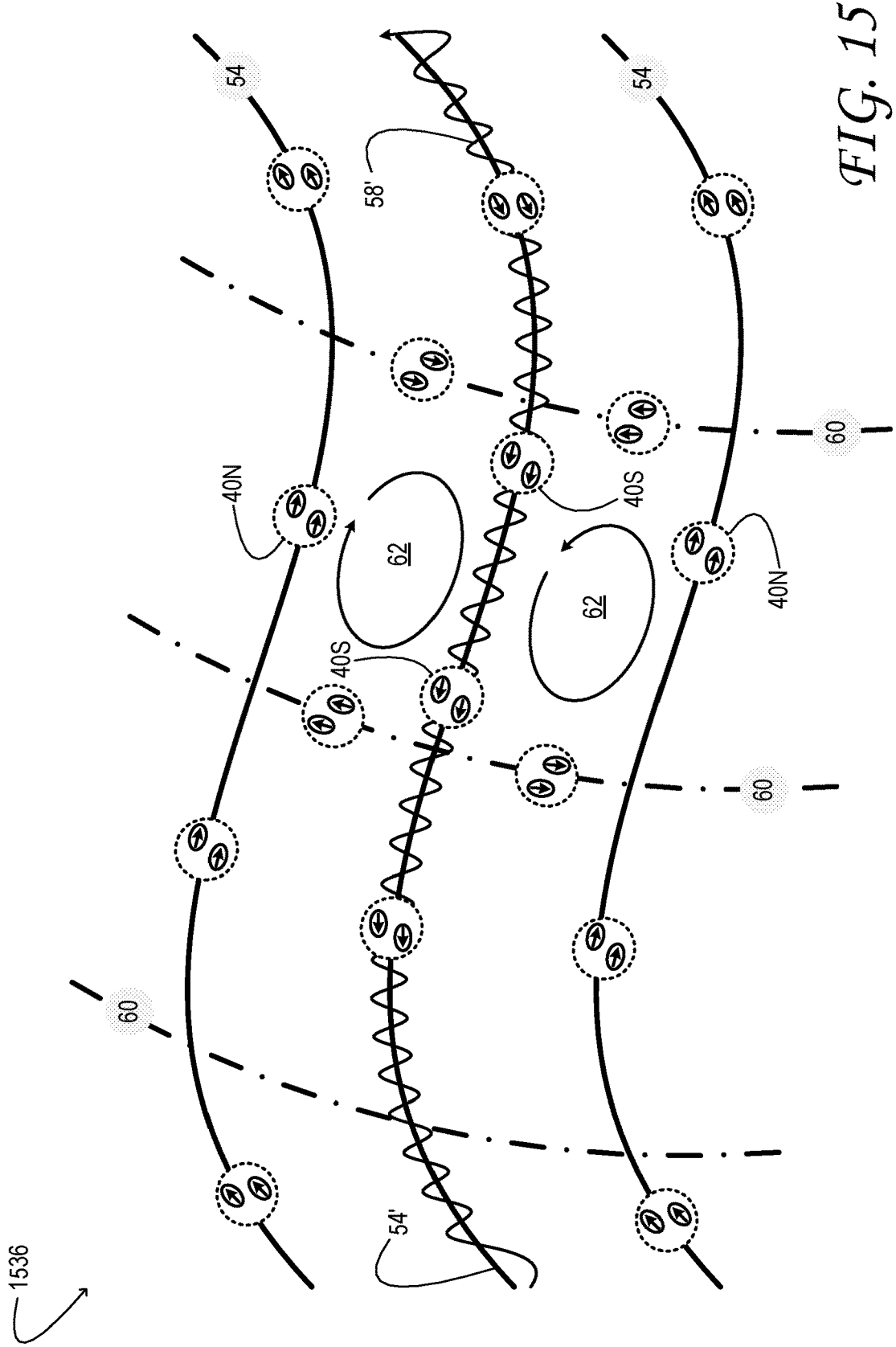

FIG. 14 schematically shows the orientation of the magnetic dipoles and the resulting magnetic current 62 between adjacent ferromagnetic shunt fibers 60 when the electropermanent magnetic array is turned ON. FIG. 15 shows an example of an electropermanent magnetic fabric layer 1536, in which an embroidered winding 58' is used in place of loop winding 58.

It will be understood that the various magnetic fabric layers described above may be combined in any desired way to create a magnetic actuator having desired properties. In embodiments comprising opposing first and second magnetic layers 36, first magnetic layer 36A may be controllable, and second magnetic layer 36B may be non-controllable. For example, the controllable first magnetic layer may comprise an electromagnetic or electropermanent magnetic fabric layer, while the non-controllable second magnetic layer may comprise a permanent magnetic fabric layer. In other embodiments, first magnetic layer 36A and second magnetic layer 36B may both be controllable—e.g., electromagnetic or electropermanent magnetic fabric layers. Accordingly, all combinations and subcombinations of the above embodiments are fully envisaged.

To ensure that magnetic actuator 34 varies the force of interaction under appropriate conditions, control circuit 42 may be communicatively coupled to one or more computers of display system 10, such as on-board computer 20 of headset 14. In the non-limiting body-restriction implementation detailed further above, contact between the user's body and virtual objects in the virtual or mixed reality environment may be determined with reference to the virtual environmental model hosted by the computer and to tracked body positions.

No aspect of the foregoing description should be understood in a limiting sense, for numerous variations, extensions, and omissions are contemplated as well. In some examples, a body-movement restriction portion in the form of a magnetic actuator may be used in medical, rather than virtual or mixed reality applications. Controllable body-movement restriction may be useful for the patient rehabilitating from a skeletomuscular injury such as back/knee injury, or brain injury such as stroke. In other examples, a body-movement restriction portion may be used as an active restraint for management of seizures or potentially dangerous body movements associated with autism, psychiatric disorders, or acute substance abuse.

A body-movement restriction portion in the form of a magnetic actuator may also be amenable to various industrial-safety applications. In one example, machine vision or other environment-sensing componentry may be used to assess whether persons are in close proximity to potentially dangerous machinery. Persons wearing an appropriate body-movement restriction portion operatively coupled to the environment-sensing componentry may be protected from drawing too close to the machinery, extending a hand or finger into a cutting device, etc. In other examples, a body-movement restriction portion worn by a worker may be configured for skeletal strain mitigation. When the worker is carrying a heavy object, the body-movement restriction portion may lock into place, providing additional resistance to motion and relieving stress on the worker's fingers, wrists, arms, legs, and other skeletal joints.

In still other examples, a magnetic actuator as described above may be used in a variety of electromechanical applications, such as a closure latch for a cell phone or laptop computer. The magnetic actuator may be used to provide positive braking for a servomechanical (e.g., a robotic, soft robotic, and/or ball-joint) actuator. Various other magnetic-actuator implementations employing opposing magnetic fabric or other flexible magnetic layers are equally envisaged.

Additionally, some of the magnetic actuator examples described herein also may be used as sensors, for relative motion between the opposing magnetic layers may induce an electromotive force (EMF) in any winding included therein. As such, the structures described herein may be used both to provide a controllable resistance to motion and to provide sensor output regarding of the rate of relative motion. In one example, measurement of voltage across or current through the winding may provide an indication of the rate of relative motion.

As noted above, the methods and processes described herein may be tied to a computer system of one or more computing devices. In particular, such methods and processes may be implemented as a computer system-application program or service, an application-programming interface (API), a library, and/or other computer system-program product.

Referring again to FIG. 1, computer system 20 may be configured to enact the methods and processes described above. Computer system 20 includes a processor 22 and an electronic memory machine 24, for example. Computer system 20 includes a display subsystem, input subsystem, communication subsystem, and may include other components not shown in FIG. 1.

Processor 22 includes one or more physical devices configured to execute instructions. For example, the processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Processor 22 may be one of a plurality of processors configured to execute software instructions. Additionally or alternatively, the processor may include one or more hardware or firmware logic machines configured to execute hardware or firmware instructions. Processors of computer system 20 may be single-core or multi-core, and the instructions executed thereon may be configured for sequential, parallel, and/or distributed processing. Individual components of the computer system optionally may be distributed among two or more separate devices, which may be remotely located and/or configured for coordinated processing. Aspects of the computer system may be virtualized and executed by remotely accessible, networked computing devices configured in a cloud-computing configuration.

Electronic memory machine 24 includes one or more physical devices configured to hold instructions executable by processor 22 to implement the methods and processes described herein. When such methods and processes are implemented, the state of electronic memory machine 24 may be transformed—e.g., to hold different data.

Electronic memory machine 24 may include removable and/or built-in devices. Electronic memory machine 24 may include semiconductor memory (e.g., RAM, EPROM, EPROM, etc.), and/or magnetic memory (e.g., hard-disk drive, floppy-disk drive, tape drive, MRAM, etc.), among others. Electronic memory machine 24 may include volatile, nonvolatile, dynamic, static, read/write, read-only, random-access, sequential-access, location-addressable, file-addressable, and/or content-addressable devices.

It will be appreciated that electronic memory machine 24 includes one or more physical devices. However, aspects of the instructions described herein alternatively may be propagated by a communication medium (e.g., an electromagnetic signal, an optical signal, etc.) that is not held by a physical device for a finite duration.

Aspects of processor 22 and electronic memory machine 24 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computer system 20 implemented to perform a particular function. In some cases, a module, program, or engine may be instantiated via processor 22 executing instructions held by electronic memory machine 24. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

A display subsystem may be used to present a visual representation of data held by electronic memory machine 24. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more near-eye display devices utilizing virtually any type of technology. Such near-eye display devices may be combined with processor 22 and/or electronic memory machine 24 in a shared enclosure, or such near-eye display devices may be peripheral near-eye display devices.

An input subsystem may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

A communication subsystem may be configured to communicatively couple computer system 20 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computer system 20 to send and/or receive messages to and/or from other devices via a network such as the Internet.

Another example provides a magnetic actuator comprising a first flexible magnetic layer configured to support a first magnetic dipole; arranged in slidable contact with the first flexible magnetic layer, a second flexible magnetic layer configured to support a second magnetic dipole; and a control circuit configured to control at least the first magnetic dipole and thereby modify a force of interaction between the first and second flexible magnetic layers.

In some implementations, the first flexible magnetic layer is an electromagnetic fabric layer having a winding coupled electrically to the control circuit, and the first magnetic dipole is an induced magnetic dipole of the electromagnetic fabric layer. In some implementations, the winding encircles the first magnetic fabric layer. In some implementations, the winding extends helically across the first magnetic fabric layer. In some implementations, the second flexible magnetic layer is a permanent flexible magnetic layer, and the second magnetic dipole is a permanent magnetic dipole of the permanent flexible magnetic layer. In some implementations, the permanent magnetic dipole is arranged in a fiber of the second flexible magnetic layer. In some implementations, the permanent magnetic dipole is an element of a Halbach array. In some implementations, the first magnetic dipole is an element of an electropermanent magnetic array. In some implementations, the first flexible magnetic layer includes a winding coupled electrically to the control circuit and configured to form an induced magnetic field in the first flexible magnetic layer on passage of electric current through the winding. In some implementations, the first magnetic dipole is reoriented by the induced magnetic field. In some implementations, the first magnetic dipole is arranged in a lower-coercivity magnetic fiber of the first flexible magnetic layer, the first flexible magnetic layer also including a higher-coercivity magnetic fiber running in a same direction as the lower-coercivity magnetic fiber. In some implementations, the higher-coercivity magnetic fiber includes neodymium-iron-boron, and the lower-coercivity fiber includes aluminum-nickel-cobalt. In some implementations, the first flexible magnetic layer includes a ferromagnetic shunt fiber oriented transverse to the lower-coercivity fiber and to the higher-coercivity fiber. In some implementations, the ferromagnetic shunt fiber includes iron.

Another example provides a magnetic actuator comprising an electromagnetic fabric layer configured to support an induced magnetic dipole, the electromagnetic fabric layer including a winding configured to form the induced magnetic dipole on passage of electric current through the winding; arranged in slidable contact with the electromagnetic fabric layer, a permanent magnetic fabric layer configured to support a permanent magnetic dipole; and a control circuit electrically coupled to the winding and configured to control the electric current passing through the winding.

In some implementations, the permanent magnetic dipole is an element of a Halbach array. In some implementations, the winding encircles or extends helically across the electromagnetic fabric layer.

Another example provides a magnetic actuator comprising an electropermanent magnetic fabric layer configured to support a first permanent magnetic dipole, the electropermanent magnetic fabric layer including a winding configured to form a transient magnetic dipole on passage of electric current through the winding; arranged in slidable contact with the electropermanent magnetic fabric layer, a permanent magnetic fabric layer configured to support a second permanent magnetic dipole; and a control circuit electrically coupled to the winding and configured to control the electric current through the winding.

In some implementations, the first permanent magnetic dipole is arranged in a lower-coercivity magnetic fiber of the electropermanent magnetic fabric layer, the electropermanent magnetic fabric layer also including a higher-coercivity magnetic fiber arranged parallel to the lower-coercivity fiber, and the electropermanent magnetic fabric layer includes a magnetic shunt fiber oriented transverse to the lower-coercivity fiber and to the higher-coercivity fiber. In some implementations, the winding encircles or extends helically across the electropermanent magnetic fabric layer.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A magnetic actuator comprising:
   a first flexible magnetic layer configured to support a first magnetic dipole;
   arranged in slidable contact with the first flexible magnetic layer, a second flexible magnetic layer configured to support a second magnetic dipole; and
   a control circuit configured to control at least the first magnetic dipole and thereby modify a force of interaction between the first and second flexible magnetic layers.

2. The magnetic actuator of claim 1 wherein the first flexible magnetic layer is an electromagnetic fabric layer having a winding coupled electrically to the control circuit, and wherein the first magnetic dipole is an induced magnetic dipole of the electromagnetic fabric layer.

3. The magnetic actuator of claim 2 wherein the winding encircles the first magnetic fabric layer.

4. The magnetic actuator of claim 2 wherein the winding extends helically across the first magnetic fabric layer.

5. The magnetic actuator of claim 1 wherein the second flexible magnetic layer is a permanent flexible magnetic layer, and wherein the second magnetic dipole is a permanent magnetic dipole of the permanent flexible magnetic layer.

6. The magnetic actuator of claim 5 wherein the permanent magnetic dipole is arranged in a fiber of the second flexible magnetic layer.

7. The magnetic actuator of claim 5 wherein the permanent magnetic dipole is an element of a Halbach array.

8. The magnetic actuator of claim 1 wherein the first magnetic dipole is an element of an electropermanent magnetic array.

9. The magnetic actuator of claim 8 wherein the first flexible magnetic layer includes a winding coupled electrically to the control circuit and configured to form an induced magnetic field in the first flexible magnetic layer on passage of electric current through the winding.

10. The magnetic actuator of claim 9 wherein the first magnetic dipole is reoriented by the induced magnetic field.

11. The magnetic actuator of claim 8 wherein the first magnetic dipole is arranged in a lower-coercivity magnetic fiber of the first flexible magnetic layer, the first flexible magnetic layer also including a higher-coercivity magnetic fiber running in a same direction as the lower-coercivity magnetic fiber.

12. The magnetic actuator of claim 11 wherein the higher-coercivity magnetic fiber includes neodymium-iron-boron, and the lower-coercivity fiber includes aluminum-nickel-cobalt.

13. The magnetic actuator of claim 8 wherein the first flexible magnetic layer includes a ferromagnetic shunt fiber oriented transverse to the lower-coercivity fiber and to the higher-coercivity fiber.

14. The magnetic actuator of claim 13 wherein the ferromagnetic shunt fiber includes iron.

15. A magnetic actuator, comprising:
   an electromagnetic fabric layer configured to support an induced magnetic dipole, the electromagnetic fabric layer including a winding configured to form the induced magnetic dipole on passage of electric current through the winding;
   arranged in slidable contact with the electromagnetic fabric layer, a permanent magnetic fabric layer configured to support a permanent magnetic dipole; and
   a control circuit electrically coupled to the winding and configured to control the electric current passing through the winding.

16. The magnetic actuator of claim 15 wherein the permanent magnetic dipole is an element of a Halbach array.

17. The magnetic actuator of claim 15 wherein the winding encircles or extends helically across the electromagnetic fabric layer.

18. A magnetic actuator, comprising:
   an electropermanent magnetic fabric layer configured to support a first permanent magnetic dipole, the electropermanent magnetic fabric layer including a winding configured to form a transient magnetic dipole on passage of electric current through the winding;
   arranged in slidable contact with the electropermanent magnetic fabric layer, a permanent magnetic fabric layer configured to support a second permanent magnetic dipole; and
   a control circuit electrically coupled to the winding and configured to control the electric current through the winding.

19. The magnetic actuator of claim 18 wherein the first permanent magnetic dipole is arranged in a lower-coercivity magnetic fiber of the electropermanent magnetic fabric layer, the electropermanent magnetic fabric layer also including a higher-coercivity magnetic fiber arranged parallel to the lower-coercivity fiber, and wherein the electropermanent magnetic fabric layer includes a magnetic shunt fiber oriented transverse to the lower-coercivity fiber and to the higher-coercivity fiber.

20. The magnetic actuator of claim 18 wherein the winding encircles or extends helically across the electropermanent magnetic fabric layer.

* * * * *